United States Patent
Inomata et al.

(10) Patent No.: US 9,219,424 B2
(45) Date of Patent: Dec. 22, 2015

(54) MATRIX CONVERTER

(71) Applicant: KABUSHIKI KAISHA YASKAWA DENKI, Kitakyushu-shi (JP)

(72) Inventors: Kentaro Inomata, Kitakyushu (JP); Hidenori Hara, Kitakyushu (JP); Takahiro Uchino, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/303,567

(22) Filed: Jun. 12, 2014

(65) Prior Publication Data

US 2015/0003136 A1    Jan. 1, 2015

(30) Foreign Application Priority Data

Jun. 28, 2013 (JP) ................................. 2013-137372

(51) Int. Cl.
*H02M 5/275* (2006.01)
*H02M 5/293* (2006.01)
*H02M 1/14* (2006.01)

(52) U.S. Cl.
CPC ................ *H02M 5/293* (2013.01); *H02M 1/14* (2013.01)

(58) Field of Classification Search
CPC .................................................... H02M 5/293
USPC ........... 363/34, 37, 84, 85, 97, 131, 157, 163, 363/164
See application file for complete search history.

(56) References Cited

U.S. PATENT DOCUMENTS

2007/0217243 A1* 9/2007 Yamamoto ............ H02M 5/597
363/160
2014/0268970 A1 9/2014 Tanaka et al.

FOREIGN PATENT DOCUMENTS

| EP | 2017947 | 1/2009 |
|---|---|---|
| JP | 05-260762 | 10/1993 |
| JP | 10-080147 | 3/1998 |
| JP | 2004-222338 | 8/2004 |
| JP | 2008-259380 | 10/2008 |
| WO | WO 2010/044455 | 4/2010 |
| WO | WO 2013/080744 | 6/2013 |

OTHER PUBLICATIONS

Japanese Office Action for corresponding JP Application No. 2013-137372, Jun. 2, 2015.
Extended European Search Report for corresponding EP Application No. 14169778.9-1804, Aug. 28, 2015.

* cited by examiner

*Primary Examiner* — Adolf Berhane
*Assistant Examiner* — Afework Demisse
(74) *Attorney, Agent, or Firm* — Mori & Ward, LLP

(57) ABSTRACT

A matrix converter according to an embodiment includes a voltage command corrector and a drive signal generator. The voltage command corrector corrects the magnitude of an output voltage command on the basis of amplitude variations of an input current from an AC power supply to a power converter, the amplitude variations being caused by a ripple component of the input current. The drive signal generator generates drive signals that turn ON/OFF a plurality of bidirectional switches on the basis of the output voltage command corrected by the voltage command corrector.

14 Claims, 5 Drawing Sheets

MATRIX CONVERTER

CROSS-REFERENCE TO RELATED APPLICATIONS

The present disclosure contains subject matter related to that disclosed in Japanese Priority Patent Application JP 2013-137372 filed in the Japan Patent Office on Jun. 28, 2013, the entire contents of which are hereby incorporated by reference.

BACKGROUND

1. Field of the Invention

The embodiments disclosed herein relate to a matrix converter.

2. Description of the Related Art

A matrix converter has a plurality of bidirectional switches connecting an alternating-current (AC) power supply and a load. With these bidirectional switches, each phase voltage of the AC power supply is directly switched, thereby outputting an arbitrary voltage/frequency to the load.

It is known that, theoretically, a matrix converter is capable of outputting an undistorted sinusoidal voltage up to 0.866 times the fundamental wave of an input voltage. Depending on applications, a matrix converter is desired to be operated in an area where the output voltage saturates (hereinafter referred to as a "saturation area").

In the case of driving an induction motor, for example, there is technology that controls the output voltage to be a sinusoidal wave by controlling a magnetic flux to be weakened in a saturation area (for example, see Japanese Unexamined Patent Application Publication No. 5-260762). With this technology, the output voltage increases by an amount equal to the weakened amount of the magnetic flux.

In this regard, technology that moderates an increase in an input current in a saturation area by multiplying an output voltage command by a gain in the saturation area (for example, see Japanese Unexamined Patent Application Publication No. 2008-259380) is proposed.

However, the technology which multiples an output voltage command by a gain in the saturation area has a problem that the input current becomes distorted because the output voltage is distorted.

SUMMARY

According to an aspect of the disclosure, there is provided a matrix converter including a power converter and a controller. The power converter includes a plurality of bidirectional switches that connect phases of an alternating-current power supply and phases of a load. The controller controls the plurality of bidirectional switches and performs power conversion between the alternating-current power supply and the load. The controller includes a voltage command generator, a voltage command corrector, and a drive signal generator. The voltage command generator generates an output voltage command that controls an output voltage from the power converter to the load. The voltage command corrector corrects the magnitude of the output voltage command on the basis of amplitude variations of an input current from the alternating-current power supply to the power converter, the amplitude variations being caused by a ripple component of the input current. The drive signal generator generates drive signals that turn ON/OFF the plurality of bidirectional switches on the basis of the output voltage command corrected by the voltage command corrector.

DESCRIPTION OF THE EMBODIMENTS

Hereinafter, a matrix converter according to embodiments will be described in detail with reference to the drawings. Note that the disclosure is not limited by the embodiments described below.

First Embodiment

Figure 1:
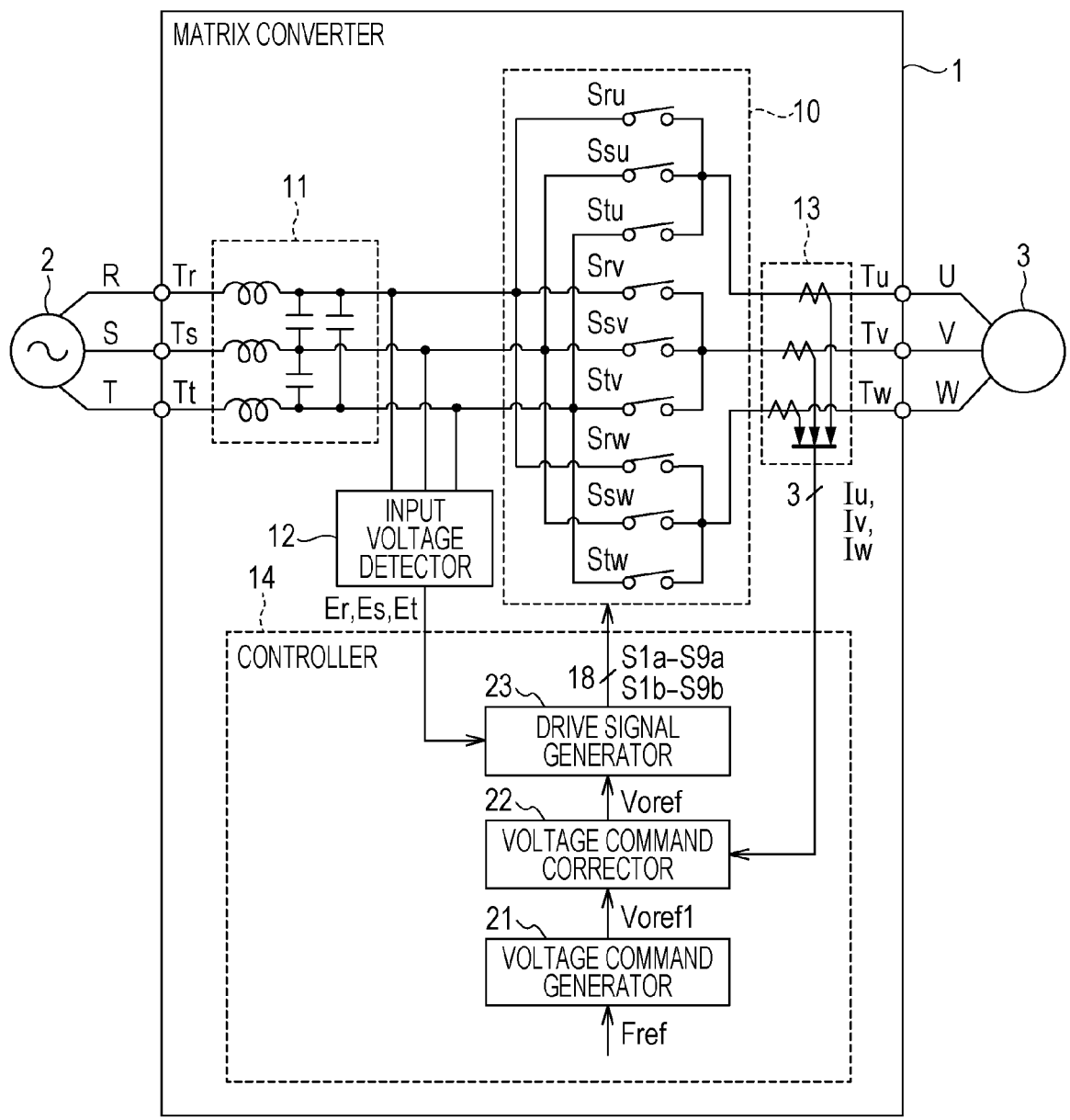
FIG. 1 is a diagram illustrating an exemplary configuration of a matrix converter according to a first embodiment.

FIG. 1 is a diagram illustrating an exemplary configuration of a matrix converter according to a first embodiment. As illustrated in FIG. 1, a matrix converter 1 according to the first embodiment is provided between a three-phase AC power supply 2 (hereinafter simply referred to as an "AC power supply 2") and a load 3. The load 3 is an AC motor such as a permanent magnet synchronous motor (PSMS). In the following, the AC power supply 2 side is referred to as an input side, and the load 3 side is referred to as an output side. In addition, the R phase, S phase, and T phase of the AC power supply 2 are referred to as input phases, and the U phase, V phase, and W phase of the load 3 are referred to as output phases.

The matrix converter 1 includes input terminals Tr, Ts, and Tt and output terminals Tu, Tv, and Tw. The R phase, S phase, and T phase of the AC power supply 2 are connected to the input terminals Tr, Ts, and Tt, respectively. The U phase, V phase, and W phase of the load 3 are connected to the output terminals Tu, Tv, and Tw, respectively. The matrix converter 1 converts three-phase AC power supplied from the AC power supply 2 via the input terminals Tr, Ts, and Tt to three-phase AC power with an arbitrary voltage and an arbitrary frequency, and outputs this three-phase AC power from the output terminals Tu, Tv, and Tw to the load 3.

As illustrated in FIG. 1, the matrix converter 1 described above includes a power converter 10, an LC filter 11, an input voltage detector 12, an output current detector 13, and a controller 14.

The power converter 10 includes a plurality of bidirectional switches Sru, Ssu, Stu, Srv, Ssv, Stv, Srw, Ssw, and Stw (hereinafter may collectively be referred to as "bidirectional switches Sw") connecting the phases of the AC power supply 2 and the phases of the load 3.

The bidirectional switches Sru, Ssu, and Stu are respectively connected between the R phase, S phase, and T phase of the AC power supply 2 and the U phase of the load 3. The bidirectional switches Srv, Ssv, and Stv are respectively connected between the R phase, S phase, and T phase of the AC power supply 2 and the V phase of the load 3. The bidirectional switches Srw, Ssw, and Stw are respectively connected between the R phase, S phase, and T phase of the AC power supply 2 and the W phase of the load 3.

Figure 2:
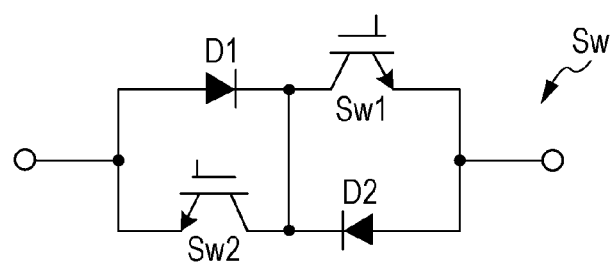
FIG. 2 is a diagram illustrating an exemplary configuration of each bidirectional switch illustrated in FIG. 1.

Each of the bidirectional switches Sw can be configured with, for example, as illustrated in FIG. 2, diodes D1 and D2 and unidirectional switching elements Sw1 and Sw2. FIG. 2 is a diagram illustrating an exemplary configuration of each of the bidirectional switches Sw illustrated in FIG. 1. The unidirectional switching elements Sw1 and Sw2 are semiconductor switching elements such as metal-oxide-semiconductor field-effect transistors (MOSFETs) or insulated gate bipolar transistors (IGBTs).

Note that the bidirectional switches Sw are not limited to the configuration illustrated in FIG. 2. For example, the bidirectional switches Sw may have a configuration in which, for example, serial connection bodies, each including a unidirectional switching element and a diode, are anti-parallel connected. Alternatively, the bidirectional switches Sw may have a configuration in which, for example, unidirectional switching elements including reverse blocking switching elements are connected in parallel in the opposite directions.

The LC filter 11 is provided between the R phase, S phase, and T phase of the AC power supply 2 and the power converter 10. The LC filter 11 moderates a high-frequency current that flows from the power converter 10 into the AC power supply 2. Specifically, the LC filter 11 includes three reactors connected between the phases of the AC power supply 2 and the power converter 10, and three capacitors connected between ends of the reactors. The LC filter 11 removes a high-frequency component caused by switching of the bidirectional switches Sw.

The input voltage detector 12 detects voltage values Er, Es, and Et of the R phase, S phase, and T phase of the AC power supply 2 (hereinafter referred to as "input phase voltages Er, Es, and Et").

The output current detector 13 detects output current that flows between the power converter 10 and the load 3. Specifically, the output current detector 13 detects the instantaneous values Iu, Iv, and Iw of currents that flow between the power converter 10 and the U phase, V phase, and W phase of the load 3 (hereinafter referred to as "output phase currents Iu, Iv, and Iw"). Note that the output current detector 13 is, for example, a current sensor that detects current using a Hall effect sensor such as a magneto-electric transducer.

The controller 14 generates drive signals S1a to S9a and S1b to S9b (hereinafter may collectively be referred to as "drive signals S") on the basis of the input phase voltages Er, Es, and Et and the output phase currents Iu, Iv, and Iw. With the drive signals S1a to S9a and S1b to S9b, the bidirectional switches Sw are controlled, and power conversion between the AC power supply 2 and the load 3 is performed.

The controller 14 generates drive signals S such that input power from the AC power supply 2 to the power converter 10 will be maintained at a constant power factor (hereinafter referred to as an "input power factor"), thereby moderating frequency components other than a fundamental wave component in an input current from the AC power supply 2 to the power converter 10. Alternatively, instead of this control which maintains the input power factor constant, another control process may be used to moderate frequency components other than a fundamental wave component.

The drive signals S1a to S9a are respectively input to the gates of the nine unidirectional switching elements Sw1 included in the nine bidirectional switches Sw, thereby controlling ON/OFF of the unidirectional switching elements Sw1. In addition, the drive signals S1b to S9b are respectively input to the gates of the nine unidirectional switching elements Sw2 included in the nine bidirectional switches Sw, thereby controlling ON/OFF of the unidirectional switching elements Sw2.

The controller 14 includes a voltage command generator 21, a voltage command corrector 22, and a drive signal generator 23. The voltage command generator 21 receives a frequency command Fref and generates an output voltage command Voref1 that controls output voltages Vu, Vv, and Vw. The frequency command Fref is a command that controls the frequencies of the output voltages Vu, Vv, and Vw from the power converter 10 to the load 3. In addition, the output voltage Vu is the U-phase voltage, the output voltage Vv is the V-phase voltage, and the output voltage Vw is the W-phase voltage.

In the case where the load 3 is an AC motor, the voltage command generator 21 performs V/f control, for example, as the above-described output voltage command calculation. The V/f control is control that generates an output voltage command Voref1 on the basis of the rotation frequency and voltage characteristics of the AC motor, which is the load 3. Since the V/f control is a control scheme of the related art, a detailed description thereof is omitted here. In addition, the output voltage command Voref1 is a command that controls the amplitude of an output voltage from the power converter 10 to the load 3.

The voltage command corrector 22 detects a ripple component of an input current that flows from the AC power supply 2 to the power converter 10, and, on the basis of amplitude variations of the input current, which are caused by the ripple component, corrects the magnitude of the output voltage command Voref1.

Specifically, the voltage command corrector 22 detects amplitude variations of the input current, which are caused by the ripple component of the input current (hereinafter referred to as "input amplitude variations"), on the basis of the output phase currents Iu, Iv, and Iw detected by the output current detector 13. On the basis of the detected input amplitude variations, the voltage command corrector 22 corrects the magnitude of the output voltage command Voref1, and outputs the corrected output voltage command Voref1 as an output voltage command Voref to the drive signal generator 23.

The drive signal generator 23 generates drive signals S1a to S9a and S1b to S9b that drive the bidirectional switches Sw such that the output voltages Vu, Vv, and Vw will have amplitudes in accordance with the output voltage command Voref and the input power factor will be maintained at a set value (such as 1).

In the case where the input power factor is constant, input amplitude variations in accordance with the ripple component of the input current appear. For example, in the case where the input power factor is 1, the ripple component of the input current appears as a component only of amplitude variations of the input current, and the ripple component does not appear in phase variations of the input current. In addition, in the case where the input power factor is not 1 but is constant, the ripple component of the input current appears as input amplitude variations in accordance with the input power factor.

The amplitude of the input current is determined in accordance with the magnitude of the output voltages Vu, Vv, and Vw. Based on this, the voltage command corrector 22 in the controller 14 corrects the output voltage command Voref in accordance with the input amplitude variations. Accordingly, distortion of the input current caused by distortion of the output voltages Vu, Vv, and Vw can be reduced even in a saturation area.

For example, the voltage command corrector 22 performs correction to reduce the magnitude of the output voltage command Voref in an area where the amplitude of the input current increases due to the ripple component, and performs correction to increase the magnitude of the output voltage command Voref in an area where the amplitude of the input current decreases due to the ripple component. Accordingly, the distortion of the input current can be reduced. In addition, the voltage command corrector 22 can also perform correction to increase/decrease the magnitude of the output voltage command Voref in an area where the amplitude of the ripple component is greater than or equal to a certain value.

Figure 3:
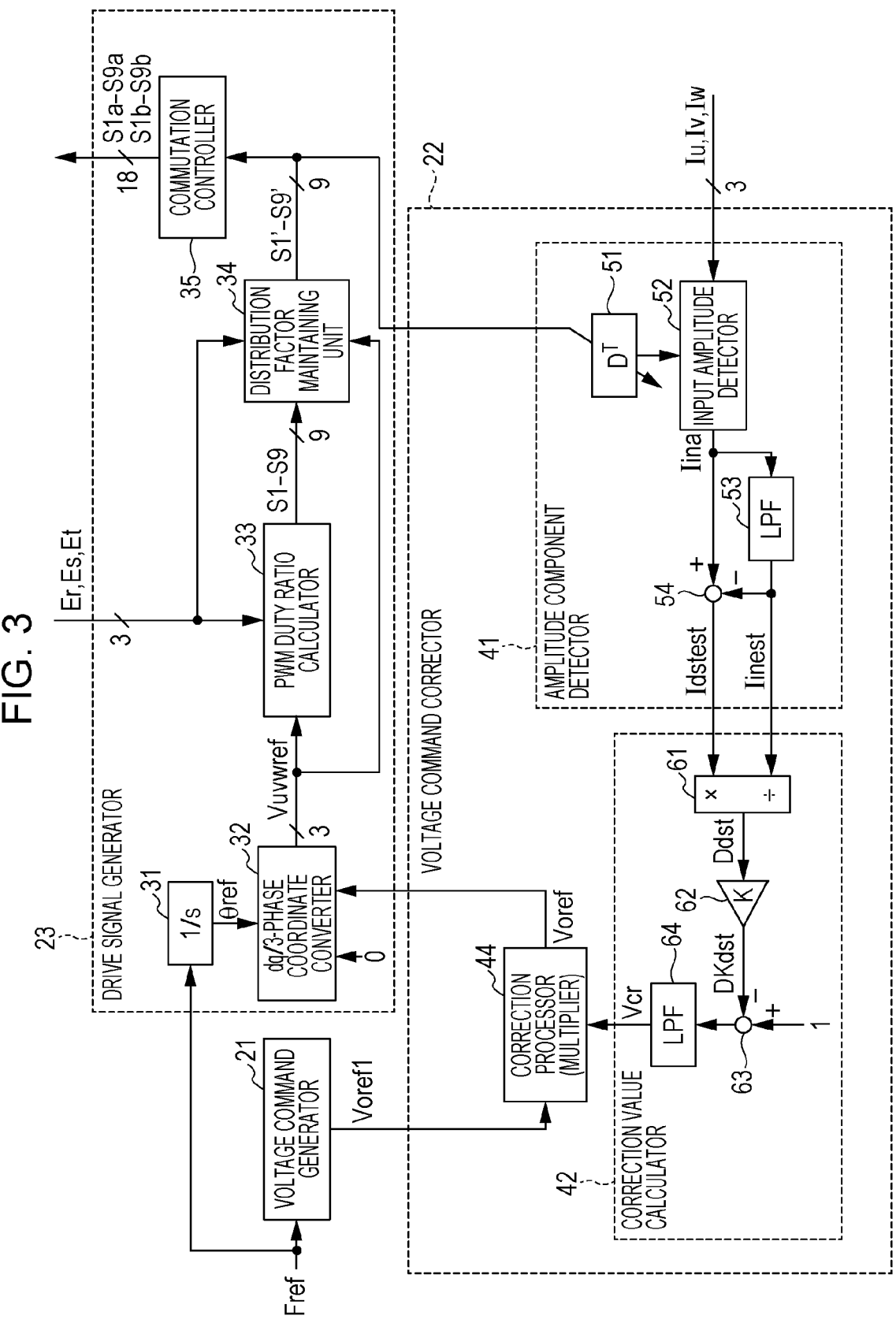
FIG. 3 is a diagram illustrating an exemplary configuration of a voltage command corrector and a drive signal generator illustrated in FIG. 1.

FIG. 3 is a diagram illustrating an exemplary configuration of the voltage command corrector 22 and the drive signal generator 23. First, the drive signal generator 23 will be described. As illustrated in FIG. 3, the drive signal generator 23 includes an integrator 31, a dq/3-phase coordinate converter 32, a phase-width-modulation (PWM) duty ratio calculator 33, a distribution factor maintaining unit 34, and a commutation controller 35.

The integrator 31 receives a frequency command Fref and integrates the input frequency command Fref, thereby generating a phase command θref. The dq/3-phase coordinate converter 32 generates three-phase output voltage commands Vuref, Vvref, and Vwref (hereinafter may be referred to as "output voltage commands Vuvwref") on the basis of the phase command θref and the output voltage command Voref. The output voltage command Vuref is the U-phase output voltage command, the output voltage command Vvref is the V-phase output voltage command, and the output voltage command Vwref is the W-phase output voltage command.

Specifically, the dq/3-phase coordinate converter 32 receives the output voltage command Voref as an output voltage command of a q-axis component in the dq-axis rotating coordinate system, and receives zero as an output voltage command of a d-axis component. The dq-axis rotating coordinate system is a rotating coordinate system where the coordinate axes rotate in synchronization with the frequencies of the output voltages Vu, Vv, and Vw. On the basis of the phase command θref, the dq/3-phase coordinate converter 32 performs coordinate conversion of the output voltage command of the q-axis component and the output voltage command of the d-axis component, thereby generating output voltage commands Vuvwref.

The PWM duty ratio calculator 33 generates PWM signals S1 to S9 respectively having duty ratios Dru, Drv, Drw, Dsu, Dsv, Dsw, Dtu, Dtv, and Dtw on the basis of the output voltage commands Vuvwref and the input phase voltages Er, Es, and Et.

The duty ratios Dru, Drv, Drw, Dsu, Dsv, Dsw, Dtu, Dtv, and Dtw (hereinafter collectively referred to as "duty ratios D") indicate the duty ratios of the bidirectional switches Sru, Ssu, Stu, Srv, Ssv, Stv, Srw, Ssw, and Stw, respectively. The duty ratios D each indicate a ratio in which a corresponding one of the bidirectional switches Sw is turned ON in one carrier period.

Technology of generating the PWM signals S1 to S9 with the duty ratios D from the output voltage command Voref is technology of the related art. For example, technology described in Japanese Unexamined Patent Application Publication No. 11-341807, Japanese Unexamined Patent Application Publication No. 2005-295640, or the like is used.

For example, in a period in which the magnitude relationship among the absolute values of the input phase voltages Er, Es, and Et remains unchanged, the PWM duty ratio calculator 33 regards the input phase voltages Er, Es, and Et in descending order of absolute value as input phase voltages Ep', Em', and En'. The PWM duty ratio calculator 33 converts the output voltage commands Vuref, Vvref, and Vwref to PWM signals S1 to S9 with duty ratios D corresponding to the voltage values of the input phase voltages Ep', Em', and En', and outputs the PWM signals S1 to S9.

In the case of a saturation area where the modulation factor of the output voltages Vu, Vv, and Vw with respect to the input phase voltages Er, Es, and Et exceeds 0.866 times, the distribution factor maintaining unit 34 adjusts the duty ratios D, while keeping the current distribution factor unchanged, such that the input power factor becomes equal to the set value, thereby changing the amplitude of the output voltages Vu, Vv, and Vw. Accordingly, controlling of the amplitude of the output voltages Vu, Vv, and Vw can be performed while maintaining the input power factor constant.

Specifically, the distribution factor maintaining unit 34 determines whether the operation is in a saturation area on the basis of the input phase voltages Er, Es, and Et and the output voltages Vu, Vv, and Vw. In the case where the operation is in a saturation area, the distribution factor maintaining unit 34 adjusts the duty ratios such that the current distribution factor will remain unchanged even in a saturation area, and outputs PWM signals S1' to S9' with the adjusted duty ratios D.

Here, it is assumed that an input phase with the maximum voltage instantaneous value is a maximum input phase Pip, and the voltage instantaneous value of the maximum input phase Pip is Ep. In addition, it is assumed that an input phase with an intermediate voltage instantaneous value is an intermediate input phase Pim, and the voltage instantaneous value of the intermediate input phase Pim is Em. In addition, it is assumed that an input phase with the minimum voltage instantaneous value is a minimum input phase Pin, and the voltage instantaneous value of the minimum input phase Pin is En.

In this case, if |Ep|<|En|, the current distribution factor is a ratio of the current of the intermediate input phase Pim to the current of the maximum input phase Pip. If |Ep|>|En|, the current distribution factor is a ratio of the current of the intermediate input phase Pim to the current of the minimum input phase Pin.

In addition, it is assumed that an output phase with the maximum voltage instantaneous value is a maximum output phase Pop, an output phase with an intermediate voltage instantaneous value is an intermediate output phase Pom, and an output phase with the minimum voltage instantaneous value is a minimum output phase Pon. For example, it is assumed that the maximum input phase Pip is the R phase, the intermediate input phase Pim is the S phase, the minimum input phase Pin is the T phase, |Ep|<|En|, the maximum output phase Pop is the U phase, the intermediate output phase Pom is the V phase, and the minimum output phase Pon is the W phase.

In this case, in the case where voltage saturation occurs and the operation enters a saturation area, the distribution factor maintaining unit 34 adjusts the duty ratio of the U-phase, which is the maximum output phase Pop. Since the ratio between the duty ratios Dru and Dsu is equal to the current distribution factor, the distribution factor maintaining unit 34 obtains duty ratios Dru' and Dsu' expressed by equations (1) below as adjusted duty ratios corresponding to the duty ratios Dru and Dsu. The duty ratios Dru' and Dsu' are adjusted such that the current distribution factor will be maintained at the same value as before the adjustment in order to satisfy Dru'/Dsu'=Dru/Dsu, and Dru'+Dsu'=1.

$$Dru'=Dru/(Dru+Dsu)$$

$$Dsu'=Dsu/(Dru+Dsu) \quad (1)$$

In addition, since the ratio between the duty ratios Drv and Dsv is equal to the current distribution factor, the distribution factor maintaining unit 34 obtains duty ratios Drv' and Dsv' expressed by equations (2) below as adjusted duty ratios corresponding to the duty ratios Drv and Dsv. In this case, the distribution factor maintaining unit 34 changes the duty ratio of the V phase in such a manner that, as indicated in equations (2) below, the rate of change becomes equal to the rate of change of the adjusted duty ratio of the U phase.

$$Drv'=Drv \times Dru'/Dru$$

$$Dsv'=Dsv \times Dsu'/Dsu \quad (2)$$

The commutation controller 35 receives the PWM signals S1' to S9' with the adjusted duty ratios D, generates drive signals S1a to S9a and S1b to S9b, and outputs the drive signals S1a to S9a and S1b to S9b to the power converter 10. The drive signals S1a to S9a and S1b to S9b are PWM signals processed to perform a commutation operation at the time the phases of the AC power supply 2 connected to the phases of the load 3 are changed by the bidirectional switches Sw.

With the commutation operation, the unidirectional switching elements Sw1 and Sw2 included in the bidirectional switches Sw are individually controlled to be ON/OFF in a certain order, thereby avoiding phase-to-phase short circuits of the AC power supply 2 and opening of the output phases of the matrix converter 1. In a period other than the commutation operation, the unidirectional switching elements Sw1 and Sw2 included in the bidirectional switches Sw are simultaneously controlled to be ON/OFF. With regard to the commutation operation, for example, technology described in International Publication No. 2008/108147 or the like is used.

Next, the voltage command corrector 22 will be described. As illustrated in FIG. 3, the voltage command corrector 22 includes an amplitude component detector 41, a correction value calculator 42, and a correction processor 44.

The amplitude component detector 41 detects the amplitude of a fundamental wave component of an input current, and a ripple component of the input current, on the basis of the output phase currents Iu, Iv, and Iw detected by the output current detector 13. The amplitude component detector 41 includes a current converter 51, an input amplitude detector 52, a low-pass filter (LPF) 53, and a subtractor 54.

The current converter 51 converts the output phase currents Iu, Iv, and Iw to input phase currents Ir, Is, and It using, for example, equation (3) described below. The input phase current Ir is the instantaneous value of a current flowing through the R phase, the input phase current Is is the instantaneous value of a current flowing through the S phase, and the input phase current It is the instantaneous value of a current flowing through the T phase.

$$\begin{bmatrix} Ir \\ Is \\ It \end{bmatrix} = \begin{bmatrix} Dru & Drv & Drw \\ Dsu & Dsv & Dsw \\ Dtu & Dtv & Dtw \end{bmatrix}^T \begin{bmatrix} Iu \\ Iv \\ Iw \end{bmatrix} \quad (3)$$

The input amplitude detector 52 converts the input phase currents Ir, Is, and It to Iα and Iβ, which are αβ-axis components of two orthogonal axes on the fixed coordinates. Furthermore, the input amplitude detector 52 calculates the square root of the sum of the squares $\sqrt{(I\alpha^2+I\beta^2)}$ to obtain an input current amplitude Iina ($=\sqrt{(I\alpha^2+I\beta^2)}$), and outputs the input current amplitude Iina to the LPF 53 and the subtractor 54.

The LPF 53 eliminates a ripple component (a frequency component higher than the output frequency) included in the input current amplitude Iina, and outputs the result as a direct current (DC) component Iinest of the input current amplitude Iina to the subtractor 54 and the correction value calculator 42. The cut-off frequency of the LPF 53 is set, on the basis of the V/f characteristic of the load 3, to a frequency that can eliminate a frequency component corresponding to a voltage where voltage saturation occurs, and is set to, for example, 2 Hz.

The subtractor 54 subtracts the DC component Iinest from the input current amplitude Iina, thereby detecting a ripple component Idstest of the input current amplitude Iina. In this manner, the amplitude component detector 41 detects and outputs the DC component Iinest and the ripple component Idstest on the basis of the output phase currents Iu, Iv, and Iw.

On the basis of the DC component Iinest and the ripple component Idstest, the correction value calculator 42 generates a voltage command correction value Vcr and outputs the voltage command correction value Vcr to the correction processor 44. The correction value calculator 42 includes a divider 61, an amplifier 62, a subtractor 63, and an LPF 64.

The divider 61 divides the ripple component Idstest by the DC component Iinest, thereby obtaining a ratio Ddst of the ripple component Idstest to the DC component Iinest (hereinafter referred to as a "distortion component ratio Ddst"). The amplifier 62 has a gain K. The amplifier 62 multiplies the distortion component ratio Ddst (=Idstest/Iinest) by K to obtain a corrected distortion component ratio DKdst (=K× Ddst), and outputs the corrected distortion component ratio DKdst to the subtractor 63. The subtractor 63 subtracts the corrected distortion component ratio DKdst from 1 to generate a voltage command correction value Vcr (=1−DKdst), and outputs the voltage command correction value Vcr to the LPF 64.

The ripple component Idstest changes between a positive value and a negative value, while the DC component Iinest is a positive value. Thus, the corrected distortion component ratio DKdst changes between a positive value and a negative value. In the case where the corrected distortion component ratio DKdst is a positive value, the voltage command correction value Vcr becomes a value less than 1; in the case where the corrected distortion component ratio DKdst is a negative value, the voltage command correction value Vcr becomes a value greater than 1.

Because the ripple component Idstest becomes a positive value in an area where the input current amplitude Iina increases to be greater than the DC component Iinest due to the ripple component of the input current (hereinafter referred to as an "amplitude increasing area"), the voltage command correction value Vcr becomes a value less than 1 in the amplitude increasing area. In addition, because the ripple component Idstest becomes a negative value in an area where the input current amplitude Iina decreases to be less than the DC component Iinest due to the ripple component of the input current (hereinafter referred to as an "amplitude decreasing area"), the voltage command correction value Vcr becomes a value greater than 1 in the amplitude decreasing area.

The LPF 64 eliminates a high frequency component of the voltage command correction value Vcr, and outputs the result to the correction processor 44. The cut-off frequency of the LPF 64 is set to, for example, 2 kHz in the case where the carrier frequency of PWM control is 10 kHz.

The correction processor 44 multiples the output voltage command Voref1 output from the voltage command generator 21 by the voltage command correction value Vcr, thereby correcting the output voltage command Voref1, and outputs the corrected output voltage command Voref1 as an output voltage command Voref.

In the case where the voltage command correction value Vcr becomes less than 1, the output voltage command Voref1 is multiplied by a value less than 1, and the magnitude of the output voltage command Voref decreases to be less than the magnitude of the output voltage command Voref1, thereby decreasing the amplitude of the output voltages Vu, Vv, and Vw. Accordingly, an increase in the amplitude of the input current caused by the ripple component of the input current is moderated, thereby reducing the distortion of the input current.

In addition, in the case where the voltage command correction value Vcr becomes greater than 1, the output voltage command Voref1 is multiplied by a value greater than 1, and the magnitude of the output voltage command Voref increases to be greater than the magnitude of the output voltage command Voref1, thereby increasing the amplitude of the output voltages Vu, Vv, and Vw. Accordingly, a decrease in the amplitude of the input current caused by the ripple component of the input current is moderated, thereby reducing the distortion of the input current.

In this manner, the matrix converter 1 according to the first embodiment is configured to correct the magnitude of the output voltage command Voref1 on the basis of amplitude variations of the input current caused by the ripple component of the input current, thereby reducing the distortion of the input current.

Note that the way the corrected distortion component ratio DKdst is obtained is not limited to that in the above-described example. For example, the ripple component Idstest may be input to the amplifier 62, the gain K of the amplifier 62 may be changed in accordance with an increase/decrease in the DC component Iinest, and the amplifier 62 may output the corrected distortion component ratio DKdst.

In addition, although the method corrects the output voltage command Voref1 in this embodiment, the method is not limited to this. As in a second embodiment, the output voltage commands Vuvwref may be corrected.

Second Embodiment

Next, a matrix converter according to a second embodiment will be described. The matrix converter according to the second embodiment is different from the matrix converter 1 according to the first embodiment which generates an output voltage command based on V/f control, in the point that the matrix converter according to the second embodiment generates an output voltage command based on vector control. Note that the load 3 is described as being an AC motor. In addition, elements corresponding to those in the above-described first embodiment are given the same reference numerals, and descriptions thereof that overlap those in the first embodiment are appropriately omitted.

Figure 4:
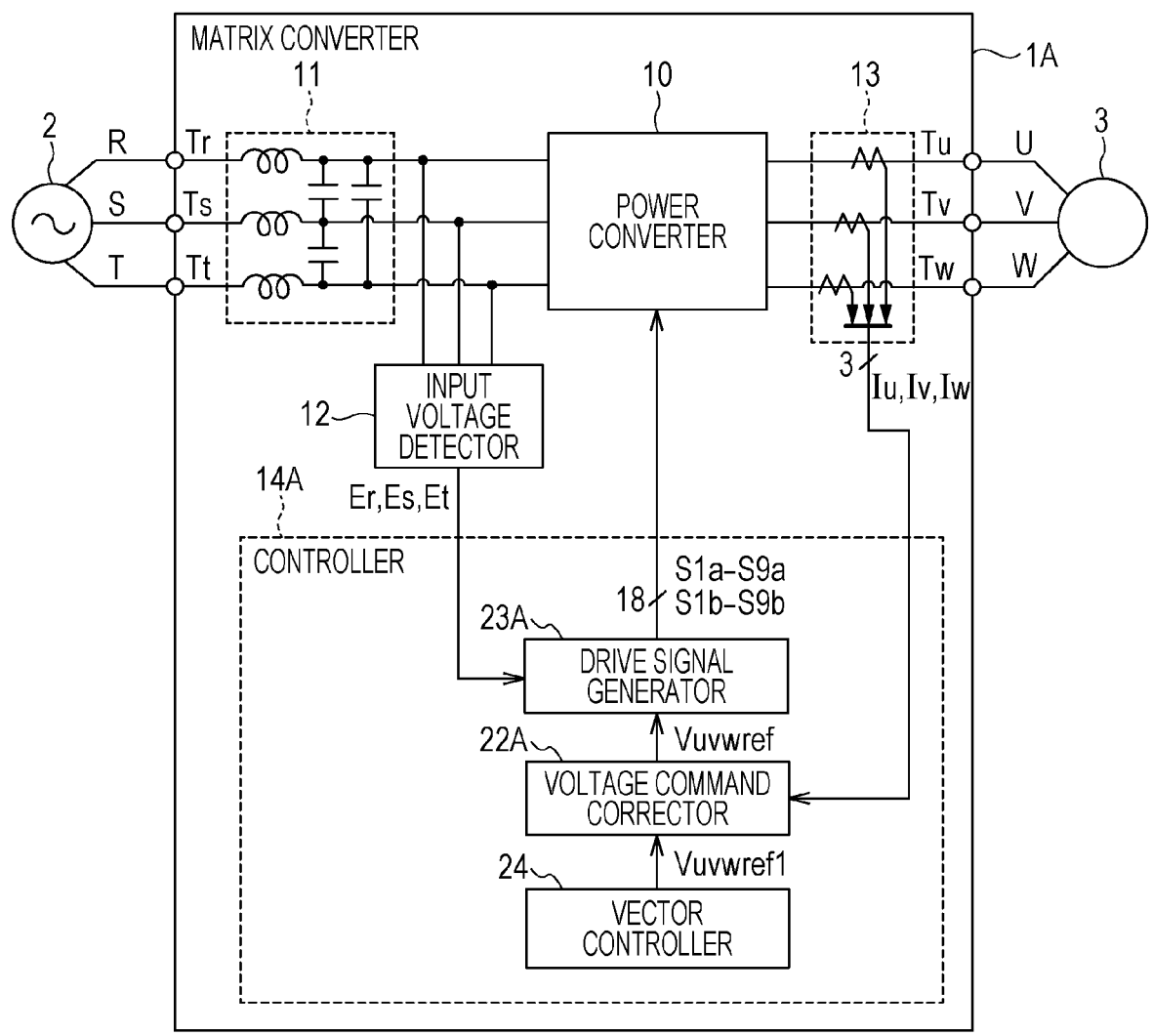
FIG. 4 is a diagram illustrating an exemplary configuration of a matrix converter according to a second embodiment.

FIG. 4 is a diagram illustrating the configuration of a matrix converter 1A according to the second embodiment. A controller 14A of the matrix converter 1A includes a voltage command corrector 22A, a drive signal generator 23A, and a vector controller 24.

In accordance with a motor vector control law of the related art, the vector controller 24 generates output voltage commands Vuref1, Vvref1, and Vwref1 (in FIG. 4, these are referred to as "output voltage commands Vuvwref1") on the basis of command signals (not illustrated) such as a speed command, an output current command, and a torque command, and detection signals (not illustrated) such as a current detection signal and a speed detection signal, and outputs the output voltage commands Vuref1, Vvref1, and Vwref1 to the voltage command corrector 22A.

The voltage command corrector 22A detects input amplitude variations on the basis of the output phase currents Iu, Iv, and Iw. The voltage command corrector 22A corrects the output voltage commands Vuref1, Vvref1, and Vwref1 on the basis of the detected input amplitude variations, and outputs the results as output voltage commands Vuref, Vvref, and Vwref to the drive signal generator 23A. The drive signal generator 23A generates drive signals S that drive the bidirectional switches Sw such that the output voltages Vu, Vv, and Vw will have amplitudes in accordance with the output voltage commands Vuref, Vvref, and Vwref, respectively, and the input power factor will be maintained at a set value (such as 1).

Figure 5:
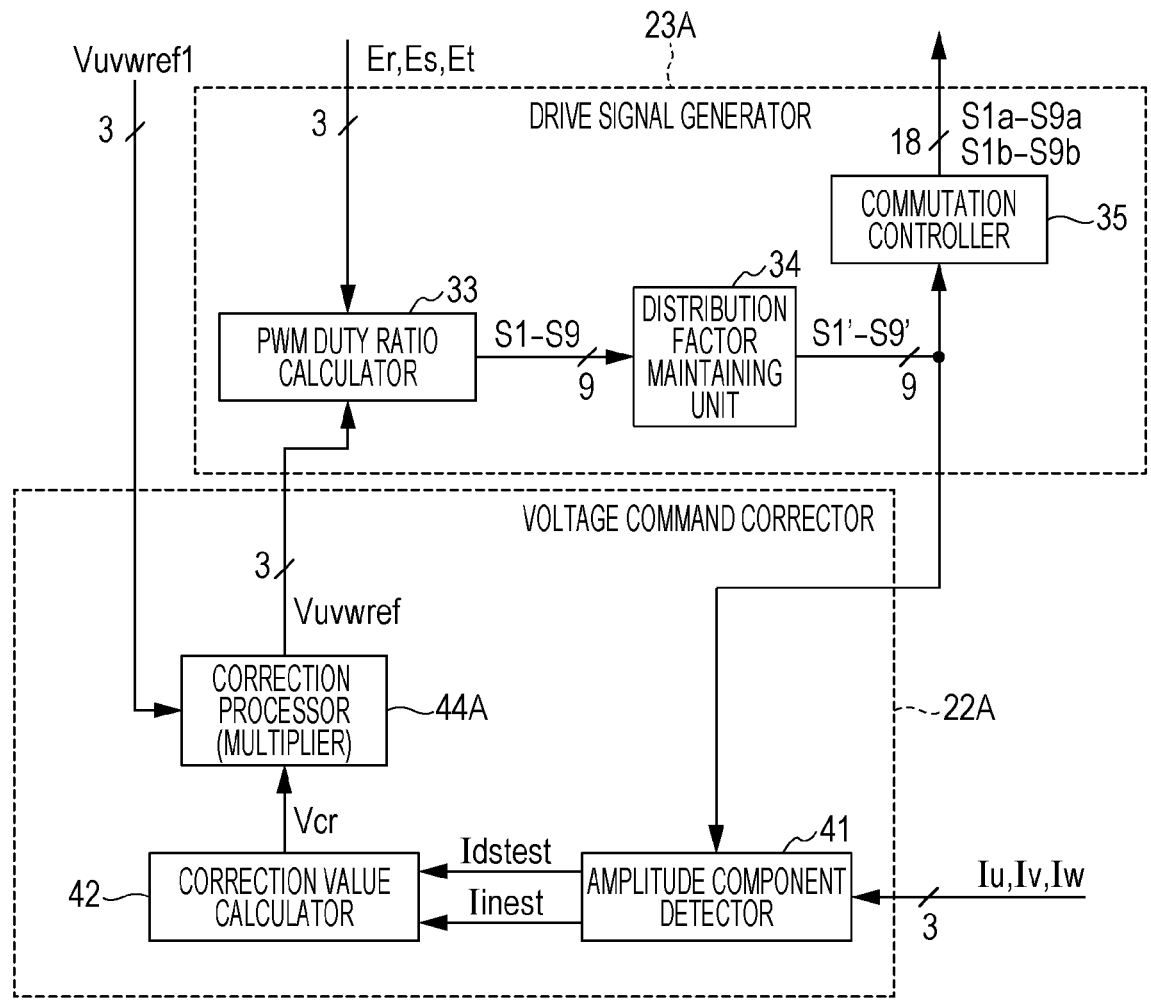
FIG. 5 is a diagram illustrating an exemplary configuration of a voltage command corrector and a drive signal generator illustrated in FIG. 4.

FIG. 5 is a diagram illustrating an exemplary configuration of the voltage command corrector 22A and the drive signal generator 23A. As illustrated in FIG. 5, the drive signal generator 23A includes the PWM duty ratio calculator 33, the distribution factor maintaining unit 34, and the commutation controller 35, while the drive signal generator 23A does not include the integrator 31 or the dq/3-phase coordinate converter 32. In this point, the drive signal generator 23A is different from the drive signal generator 23 (see FIG. 3).

In addition, the voltage command corrector 22A includes the amplitude component detector 41, the correction value calculator 42, and a correction processor 44A.

The correction processor 44A corrects the output voltage commands Vuref1, Vvref1, and Vwref1, which are input thereto, by multiplying the output voltage commands Vuref1, Vvref1, and Vwref1 by the voltage command correction value Vcr. The correction processor 44A outputs the corrected output voltage commands Vuref1, Vvref1, and Vwref1 as output voltage commands Vuref, Vvref, and Vwref.

In this manner, the matrix converter 1A according to the second embodiment generates a voltage command correction value Vcr on the basis of the DC component Iinest and the ripple component Idstest, as with the case of the matrix converter 1 according to the first embodiment. The correction processor 44A corrects the output voltage commands Vuref1, Vvref1, and Vwref1 on the basis of the voltage command correction value Vcr. Accordingly, an increase in the amplitude of the input current caused by the ripple component of the input current is moderated, thereby reducing the distortion of the input current.

Note that the method of generating a voltage command correction value Vcr is not limited to that in the above-described example. For example, a voltage command correction value Vcr may be generated using a ratio Ddst' of the ripple component Idstest to an output current command Iref. Note that the output current command Iref is generated by the vector controller 24 which has the function of a current command generator.

Figure 6:
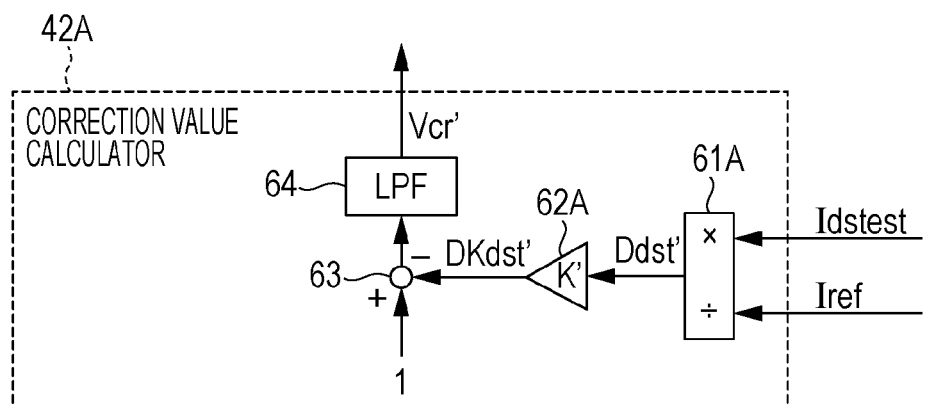
FIG. 6 is a diagram illustrating an exemplary configuration of another correction value calculator in the matrix converter according to the second embodiment.

Here, a method of generating a voltage command correction value in the case of using the output current command Iref will be described with reference to FIG. 6. FIG. 6 is a diagram illustrating an exemplary configuration of another correction value calculator 42A in the matrix converter 1A according to the second embodiment. As illustrated in FIG. 6, the correction value calculator 42A includes a divider 61A, an amplifier 62A, the subtractor 63, and the LPF 64.

The divider 61A divides the ripple component Idstest by the output current command Iref, thereby obtaining a ratio Ddst' of the ripple component Idstest to the output current command Iref (hereinafter referred to as a "distortion component ratio Ddst'"). The amplifier 62A has a gain K'. The amplifier 62A multiplies the distortion component ratio Ddst' (=Idstest/Iref) by K' to obtain a corrected distortion component ratio DKdst' (=K'×Ddst'), and outputs the corrected distortion component ratio DKdst' to the subtractor 63.

The subtractor 63 subtracts the corrected distortion component ratio DKdst' from 1 to generate a voltage command correction value Vcr' (=1−DKdst'), and outputs the voltage command correction value Vcr' to the LPF 64. The LPF 64 eliminates a high frequency component of the voltage command correction value Vcr', and outputs the result to the correction processor 44A.

In this manner, the correction value calculator 42A generates a voltage command correction value Vcr' using the output current command Iref. Compared with the case of using the fundamental wave component Iinest obtained on the basis of the detection result obtained by the output current detector 13, the distortion of the input current can be reduced in a stable manner.

Alternatively, the distortion component ratio Ddst' may be obtained by dividing the ripple component Idstest by an effective component of the output current command. An effective component of the output current command is a component of the output current command substantially parallel to a voltage output by the matrix converter 1A. For example, in the case where the load 3 is a surface permanent magnet synchronous motor (SPMM), this effective component of the output current command is a q-axis output current command. In this case, the q-axis output current command is generated by the vector controller 24 which has the function of a current command generator.

Third Embodiment

Next, a matrix converter according to a third embodiment will be described. The matrix converter according to the third embodiment is different from the matrix converters 1 and 1A according to the first and second embodiments which correct the output voltage command by multiplying the output voltage command by the voltage command correction value, in the point that the matrix converter according to the third embodiment corrects the output voltage command by adding the voltage command correction value to the output voltage command. Since the matrix converter according to the third embodiment is different from the matrix converter 1 according to the above-described first embodiment only in the configuration of a voltage command corrector, the voltage command corrector will be described below. In addition, elements corresponding to those in the above-described first embodiment are given the same reference numerals, and descriptions thereof that overlap those in the first embodiment are appropriately omitted.

Figure 7:
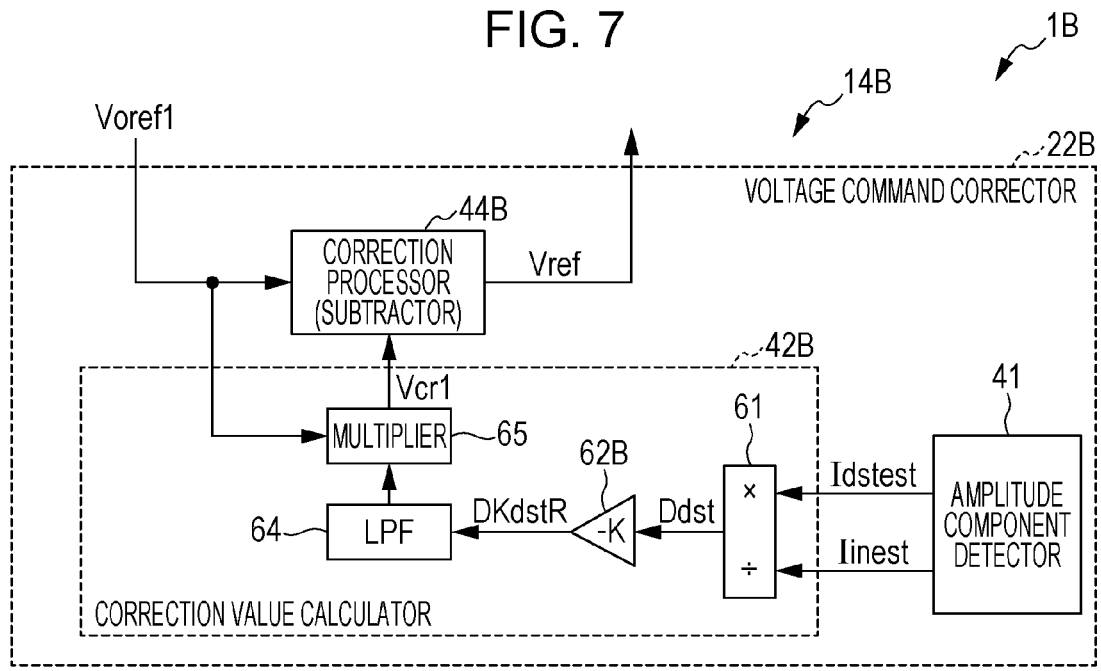
FIG. 7 is a diagram illustrating an exemplary configuration of a matrix converter according to a third embodiment.

FIG. 7 is a diagram illustrating the configuration of a voltage command corrector according to the third embodiment. As illustrated in FIG. 7, a controller 14B of a matrix converter 1B according to the third embodiment includes a voltage command corrector 22B. The voltage command corrector 22B includes the amplitude component detector 41, a correction value calculator 42B, and a correction processor 44B. The correction value calculator 42B further includes the divider 61, an amplifier 62B, the LPF 64, and a multiplier 65.

The divider 61 divides the ripple component Idstest by the DC component Iinest, thereby obtaining a distortion component ratio Ddst. The amplifier 62B has a gain −K. The amplifier 62B multiplies the distortion component ratio Ddst by −K to obtain a corrected distortion component ratio DKdstR (=−K×Ddst), and outputs the corrected distortion component ratio DKdstR to the LPF 64.

The LPF 64 eliminates a high frequency component of the corrected distortion component ratio DKdstR, and outputs the result to the multiplier 65. The multiplier 65 multiples the corrected distortion component ratio DKdstR, from which a high frequency component has been eliminated, by the output voltage command Voref1, and outputs the result as a voltage command correction value Vcr1.

The correction processor 44B corrects the output voltage command Voref1, which is input thereto, by adding the voltage command correction value Vcr1 to the output voltage command Voref1, and outputs the corrected output voltage command Voref1 as an output voltage command Voref.

Note that the gain of the amplifier 62B may be the gain K, instead of the gain −K. In this case, the correction processor 44B corrects the output voltage command Voref1, which is input thereto, by subtracting the voltage command correction value Vcr1 from the output voltage command Voref1, and outputs the corrected output voltage command Voref1 as an output voltage command Voref.

In addition, in the matrix converter 1A according to the second embodiment, the voltage command corrector 22A may be replaced by the voltage command corrector 22B. In this case, the multiplier 65 multiples the output voltage commands Vuref1, Vvref1, and Vwref1 by the corrected distortion component ratio DkdstR from which a high frequency component has been eliminated, and outputs the multiplication results as voltage command correction values Vcr1u, Vcr1v, and Vcr1w. The correction processor 44B adds or subtracts the voltage command correction values Vcr1u, Vcr1v, and Vcr1w to or from the output voltage commands Vuref1, Vvref1, and Vwref1 input thereto, thereby generating output voltage commands Vuref, Vvref, and Vwref.

In this manner, in the matrix converter 1B according to the third embodiment, the output voltage command Voref1 (Vuvwref1) is corrected by adding or subtracting the voltage command correction value Vcr1 to or from the output voltage command Voref1 (Vuvwref1), thereby reducing the distortion of the input current.

Fourth Embodiment

Next, a matrix converter according to a fourth embodiment will be described. The matrix converter according to the fourth embodiment is different from the matrix converters 1, 1A, and 1B according to the first to third embodiments in the point that the matrix converter according to the fourth embodiment detects an input current flowing from the LC filter 11 to the power converter 10 and detects a ripple component Idstest on the basis of the detection result. Note that elements corresponding to those in the above-described embodiments are given the same reference numerals, and descriptions thereof that overlap those in the above-described embodiments are appropriately omitted.

Figure 8:
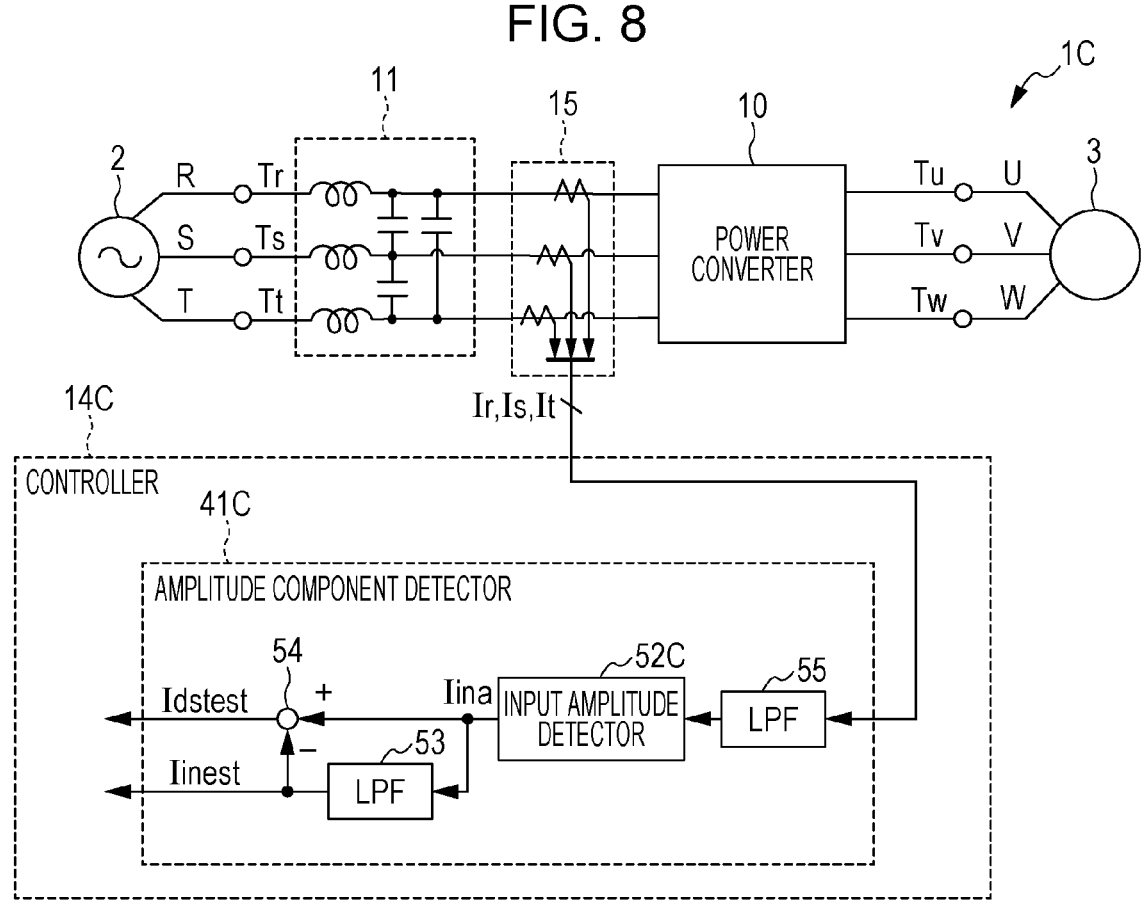
FIG. 8 is a diagram illustrating an exemplary configuration of a matrix converter according to a fourth embodiment.

FIG. 8 is a diagram illustrating the configuration of the matrix converter according to the fourth embodiment. As illustrated in FIG. 8, a matrix converter 1C according to the fourth embodiment includes the power converter 10, the LC filter 11, a controller 14C, and the input current detector 15. The controller 14C further includes an amplitude component detector 41C. Although not illustrated, the matrix converter 1C includes the input voltage detector 12 (see FIG. 1). In addition, although not illustrated, the controller 14C includes the correction value calculator 42 and the correction processor 44.

The amplitude component detector 41C further includes an LPF 55, an input amplitude detector 52C, the LPF 53, and the subtractor 54, and detects a ripple component Idstest from the input current detection result obtained by the input current detector 15.

The input current detector 15 detects an input current flowing between the LC filter 11 and the power converter 10. Specifically, the input current detector 15 detects input phase currents Ir, Is, and It that are the instantaneous values of currents flowing through the R phase, S phase, and T phase of the AC power supply 2. Note that the input current detector 15 is, for example, a current sensor that detects current using a Hall effect sensor such as a magneto-electric transducer.

The LPF 55 eliminates a high frequency component caused by switching of the bidirectional switches Sw, from components of the input phase currents Ir, Is, and It detected by the input current detector 15.

The input amplitude detector 52C converts the input phase currents Ir, Is, and It to $I\alpha$ and $I\beta$, which are $\alpha\beta$-axis components of two orthogonal axes on the fixed coordinates, and calculates the square root of the sum of the squares $\sqrt{/(I\alpha^2+I\beta^2)}$ to obtain an input current amplitude Iina $(=\sqrt{(I\alpha^2+I\beta^2)})$. The input current amplitude Iina is output from the input amplitude detector 52C to the LPF 53 and the subtractor 54.

The LPF 53 eliminates a high frequency component of the input current amplitude Iina, and outputs the result as a DC component Iinest of the input current amplitude Iina to the subtractor 54. The subtractor 54 subtracts the DC component Iinest from the input current amplitude Iina, thereby detecting a ripple component Idstest of the input current amplitude Iina.

In this manner, the amplitude component detector 41C detects and outputs the DC component Iinest and the ripple component Idstest on the basis of the input phase currents Ir, Is, and It detected by the input current detector 15.

Therefore, compared with the case in which the DC component Iinest and the ripple component Idstest are detected on the basis of the output phase currents Iu, Iv, and Iw detected by the output current detector 13, the input current can be directly detected, thereby improving the detection accuracy of the DC component Iinest and the ripple component Idstest.

It should be understood by those skilled in the art that various modifications, combinations, sub-combinations and alterations may occur depending on design requirements and other factors insofar as they are within the scope of the appended claims or the equivalents thereof.

What is claimed is:

1. A matrix converter comprising:
    a power converter including a plurality of bidirectional switches that connect phases of an alternating-current power supply and phases of a load; and
    a controller to control the plurality of bidirectional switches and to perform power conversion between the alternating-current power supply and the load, the controller comprising
        a voltage command generator to generate an output voltage command that controls an output voltage from the power converter to the load,
        a voltage command corrector to detect a ripple component of an input current from the alternating-current power supply to the power converter, the voltage command corrector to correct a magnitude of the output voltage command on the basis of amplitude variations of the input current, the amplitude variations being caused by the ripple component, and
        a drive signal generator to generate drive signals that turn ON/OFF the plurality of bidirectional switches on the basis of the output voltage command corrected by the voltage command corrector.

2. The matrix converter according to claim 1, wherein the voltage command corrector comprises
    a correction value calculator to calculate a correction value that decreases the magnitude of the output voltage command in an area where the amplitude of the input current increases due to the ripple component, and calculates a correction value that increases the magnitude of the output voltage command in an area where the amplitude of the input current decreases due to the ripple component, and
    a correction processor to correct the output voltage command by using the correction value calculated by the correction value calculator.

3. The matrix converter according to claim 2, wherein the correction value calculator calculates the correction value on the basis of a ratio of the ripple component to the amplitude of a fundamental wave component of the input current.

4. The matrix converter according to claim 2, wherein the correction processor corrects the output voltage command by multiplying, adding, or subtracting a correction value output from the correction value calculator by, to, or from the output voltage command.

5. The matrix converter according to claim 3, further comprising an output current detector to detect an output current from the power converter to the load,
    wherein the voltage command corrector includes an amplitude component detector that detects the ripple component from a result of detection of the output current obtained by the output current detector, and
    wherein the correction value calculator calculates the correction value on the basis of the ripple component detected by the amplitude component detector.

6. The matrix converter according to claim 3, further comprising a current detector to detect the input current,
    wherein the voltage command corrector includes an amplitude component detector that detects the ripple component from a result of detection of the input current obtained by the current detector, and
    wherein the correction value calculator calculates the correction value on the basis of the ripple component detected by the amplitude component detector.

7. The matrix converter according to claim 2, further comprising a current command generator to generate an output current command that controls an output current from the power converter to the load,
    wherein the voltage command generator generates the output voltage command such that the output current from the power converter to the load matches the output current command, and
    wherein the correction value calculator calculates the correction value on the basis of the ratio of the ripple component to the output current command.

8. A matrix converter comprising:
    power converting means including a plurality of bidirectional switches that connect phases of an alternating current power supply and phases of a load; and
    controlling means for controlling the plurality of bidirectional switches and performing power conversion between the alternating-current power supply and the load, the controlling means comprising
        voltage command generating means for generating an output voltage command that controls an output voltage from the power converting means to the load,
        voltage command correcting means for detecting a ripple component of an input current from the alternating-current power supply to the converting means, the voltage command correcting means for correcting a magnitude of the output voltage command on the basis of amplitude variations of the input current, the amplitude variations being caused by the ripple component, and drive signal generating means for generating drive signals that turn ON/OFF the plurality of bidirectional switches on the basis of the output voltage command corrected by the voltage command correcting means.

9. The matrix converter according to claim 8,
wherein the voltage command correcting means comprises
correction value calculating means for calculating a correction value that decreases the magnitude of the output voltage command in an area where the amplitude of the input current increases due to the ripple component, and calculating a correction value that increases the magnitude of the output voltage command in an area where the amplitude of the input current decreases due to the ripple component, and
correction processing means for correcting the output voltage command by using the correction value calculated by the correction value calculating means.

10. The matrix converter according to claim 9,
wherein the correction value calculating means calculates the correction value on the basis of a ratio of the ripple component to the amplitude of a fundamental wave component of the input current.

11. The matrix converter according to claim 9,
wherein the correction processing means corrects the output voltage command by multiplying, adding, or subtracting a correction value output from the correction value calculating means by, to, or from the output voltage command.

12. The matrix converter according to claim 10, further comprising output current detecting means for detecting an output current from the power converting means to the load,
wherein the voltage command correcting means includes amplitude component detecting means for detecting the ripple component from a result of detection of the output current obtained by the output current detecting means, and
wherein the correction value calculating means calculates the correction value on the basis of the ripple component detected by the amplitude component detecting means.

13. The matrix converter according to claim 10, further comprising current detecting means for detecting the input current,
wherein the voltage command correcting means includes amplitude component detecting means for detecting the ripple component from a result of detection of the input current obtained by the current detecting means, and
wherein the correction value calculating means calculates the correction value on the basis of the ripple component detected by the amplitude component detecting means.

14. The matrix converter according to claim 9, further comprising current command generating means for generating an output current command that controls an output current from the power converting means to the load,
wherein the voltage command generating means generates the output voltage command such that the output current from the power converting means to the load matches the output current command, and
wherein the correction value calculating means calculates the correction value on the basis of the ratio of the ripple component to the output current command.

* * * * *